(12) United States Patent
Boudin et al.

(10) Patent No.: US 12,096,068 B2
(45) Date of Patent: Sep. 17, 2024

(54) SPATIO-TEMPORAL NAVIGATION OF CONTENT OF DIFFERENT TYPES WITH SYNCHRONOUS DISPLACEMENT OF PLAYBACK POSITION INDICATORS

(71) Applicant: ORANGE, Issy-les-Moulineaux (FR)

(72) Inventors: Fabrice Boudin, Chatillon (FR); Frederic Herledan, Chatillon (FR)

(73) Assignee: ORANGE, Issy-les-Moulineaux (FR)

(*) Notice: Subject to any disclaimer, the term of this patent is extended or adjusted under 35 U.S.C. 154(b) by 621 days.

(21) Appl. No.: 16/713,825

(22) Filed: Dec. 13, 2019

(65) Prior Publication Data

US 2020/0196006 A1    Jun. 18, 2020

(30) Foreign Application Priority Data

Dec. 14, 2018   (FR) .................................... 1872971

(51) Int. Cl.
| | | |
|---|---|---|
| G06F 16/00 | (2019.01) | |
| G06F 3/16 | (2006.01) | |
| G06F 7/00 | (2006.01) | |
| G06F 16/44 | (2019.01) | |
| H04N 21/439 | (2011.01) | |

(52) U.S. Cl.
CPC ......... *H04N 21/4394* (2013.01); *G06F 3/165* (2013.01); *G06F 16/44* (2019.01)

(58) Field of Classification Search
CPC .... G06F 16/44; G06F 16/165; H04N 21/4394
USPC ........................................................ 707/741
See application file for complete search history.

(56) References Cited

U.S. PATENT DOCUMENTS

| | | | |
|---|---|---|---|
| 2007/0133518 A1 | 6/2007 | Ben-David et al. | |
| 2011/0184738 A1* | 7/2011 | Kalisky | G06F 3/167 704/260 |
| 2012/0236201 A1* | 9/2012 | Larsen | H04N 21/8106 348/468 |
| 2014/0250355 A1* | 9/2014 | Jimison | G06F 3/0483 715/202 |

(Continued)

FOREIGN PATENT DOCUMENTS

WO    2015008162 A2    1/2015

OTHER PUBLICATIONS

English machine translation of Written Opinion dated Sep. 9, 2019 for corresponding French Application No. 1872971, filed Dec. 14, 2018.

(Continued)

*Primary Examiner* — Raquel Perez-Arroyo
(74) *Attorney, Agent, or Firm* — David D. Brush; Westman, Champlin & Koehler, P.A.

(57) ABSTRACT

A method and a device for enabling a spatio-temporal navigation of content. In response to a request, from a client, for a content comprising a first content of a first type, the device transmits to the client: the first content; a second content of a second type generated from the first content; synchronization metadata associating each word of one of the contents with a time marker to the other content; and a script, for execution at the client, configured to re-establish at least one of the contents and offer a navigation of said content depending on the type of content re-established by using at least one among: the first content, the second content, and the synchronization metadata.

11 Claims, 8 Drawing Sheets

(56) References Cited

U.S. PATENT DOCUMENTS

2015/0127340 A1* 5/2015 Epshteyn ................ G10L 21/00
704/235
2016/0255383 A1* 9/2016 McCue .................. H04N 21/84
725/116
2017/0345411 A1* 11/2017 Raitio ................. G10L 13/0335

OTHER PUBLICATIONS

Search Report and Written Opinion dated Sep. 4, 2019 for corresponding French Application No. 1872971, filed Dec. 14, 2018.
Carmichael J. et al., "Multimodal indexing of digital audio-visual documents: A case study for cultural heritage data", Content-Based Multimedia Indexing, 2008. CBMI 2008, International Workshop on IEEE, Piscataway, NJ, USA, Jun. 18, 2008 (Jun. 18, 2008), pp. 93-100, XP031286351.
Michael Johnston: "Building multimodal applications with EMMA" Multimodal Interfaces, ACM, 2 Penn Plaza, Suite 701 New York, NY 10121-0701, USA, Nov. 2, 2009 (Nov. 2, 2009), pp. 47-54, XP058118392.

* cited by examiner

[Fig. 1]
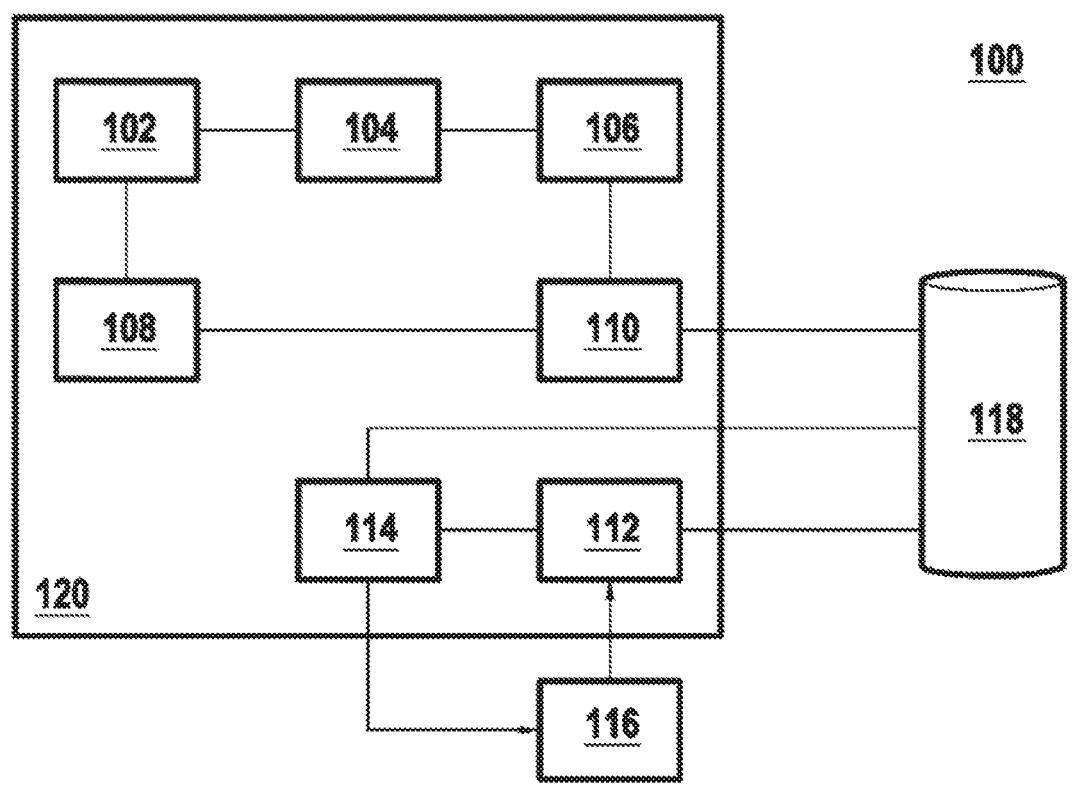

[Fig. 2]
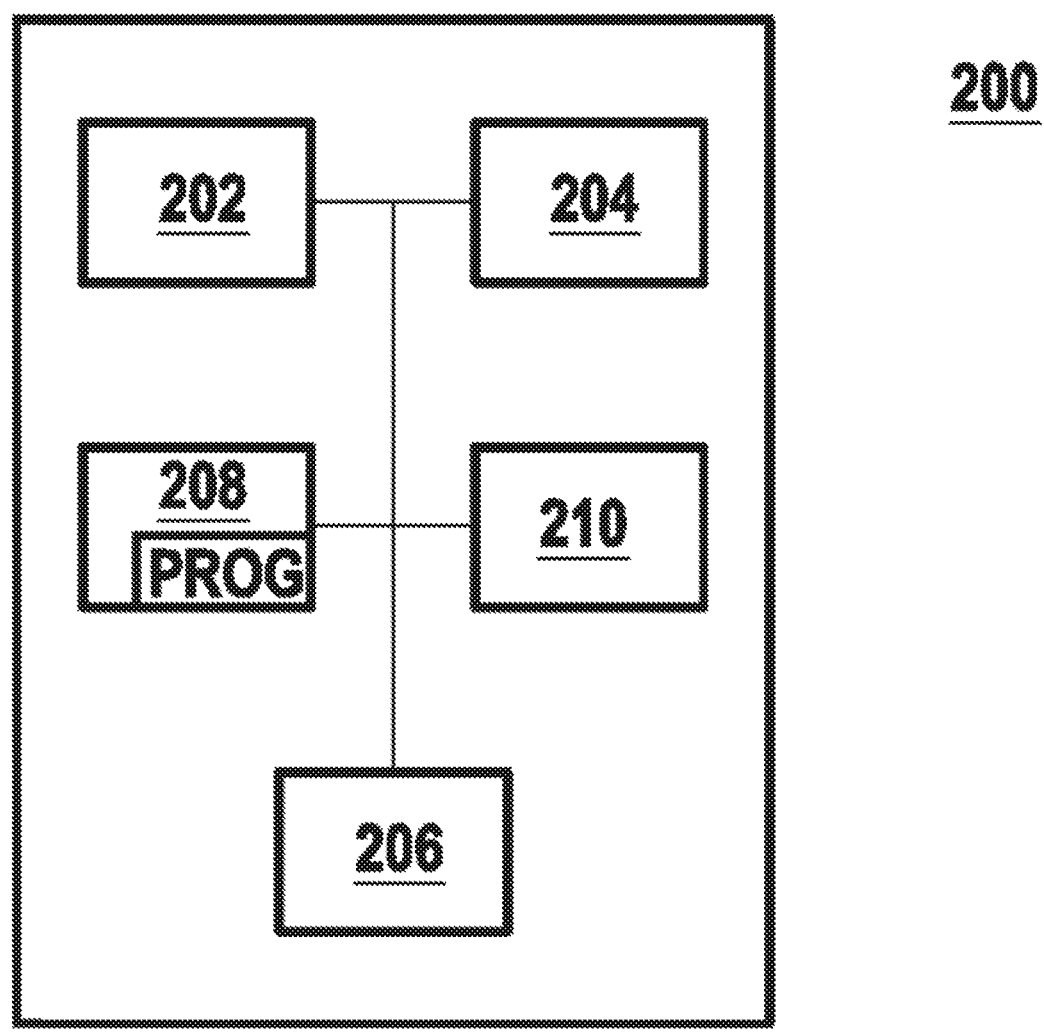

[Fig. 3]
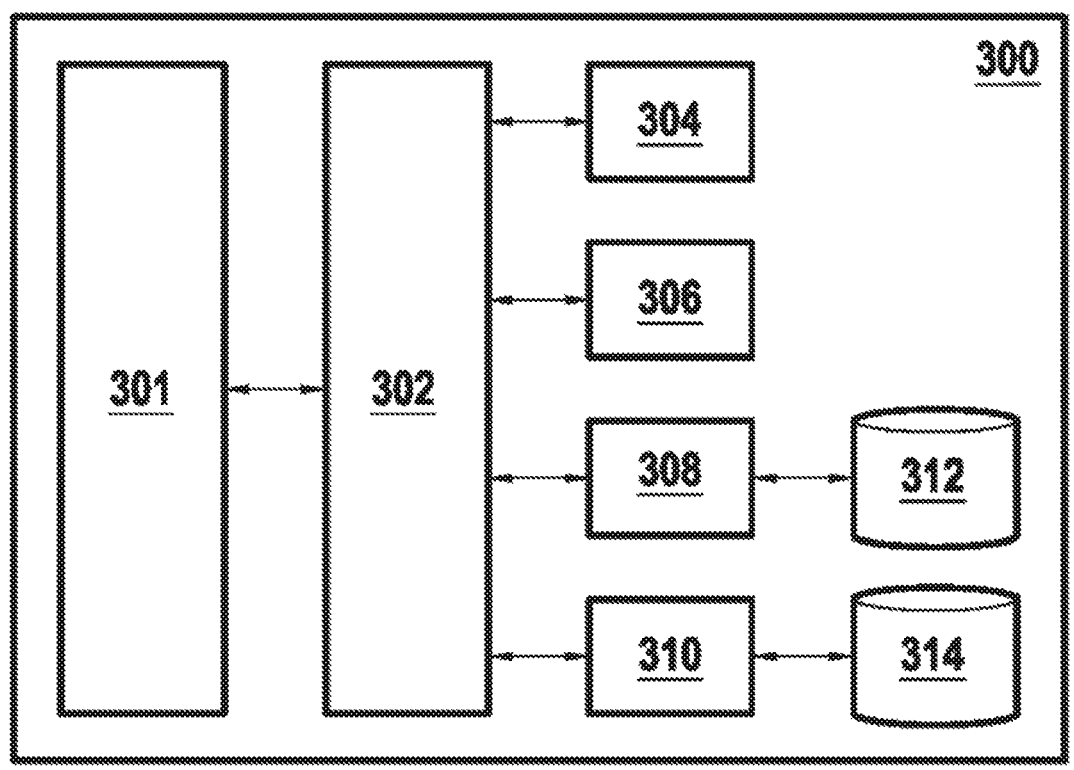

[Fig. 4]
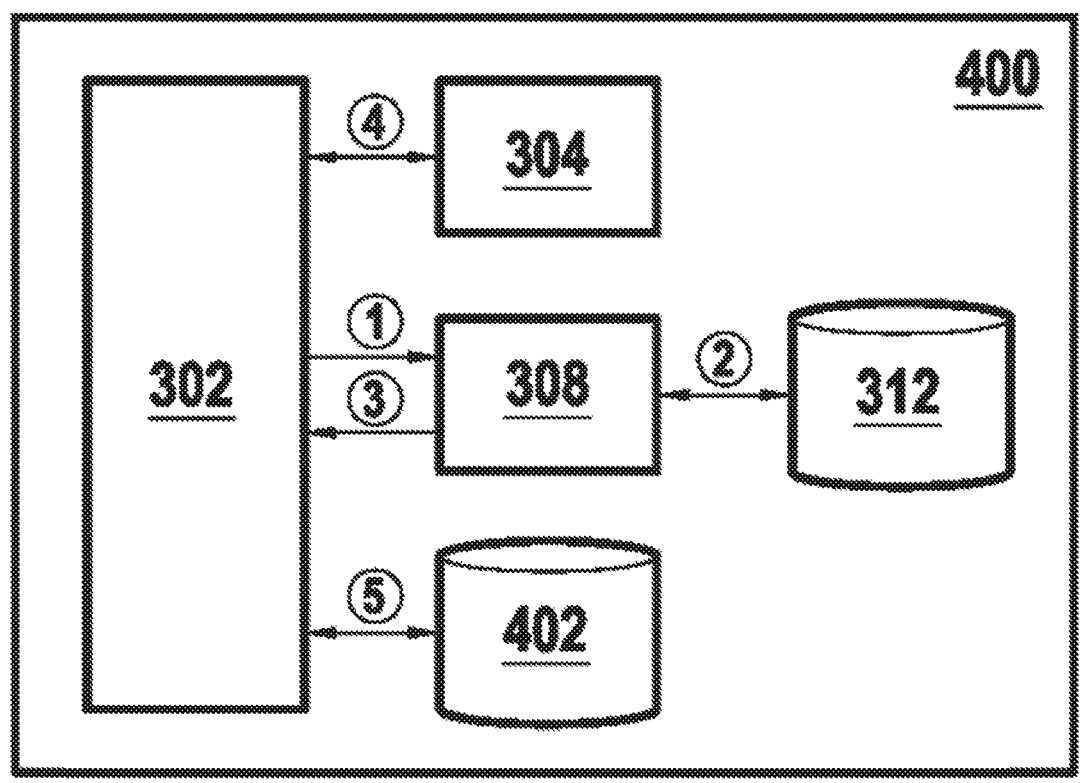

[Fig. 5]
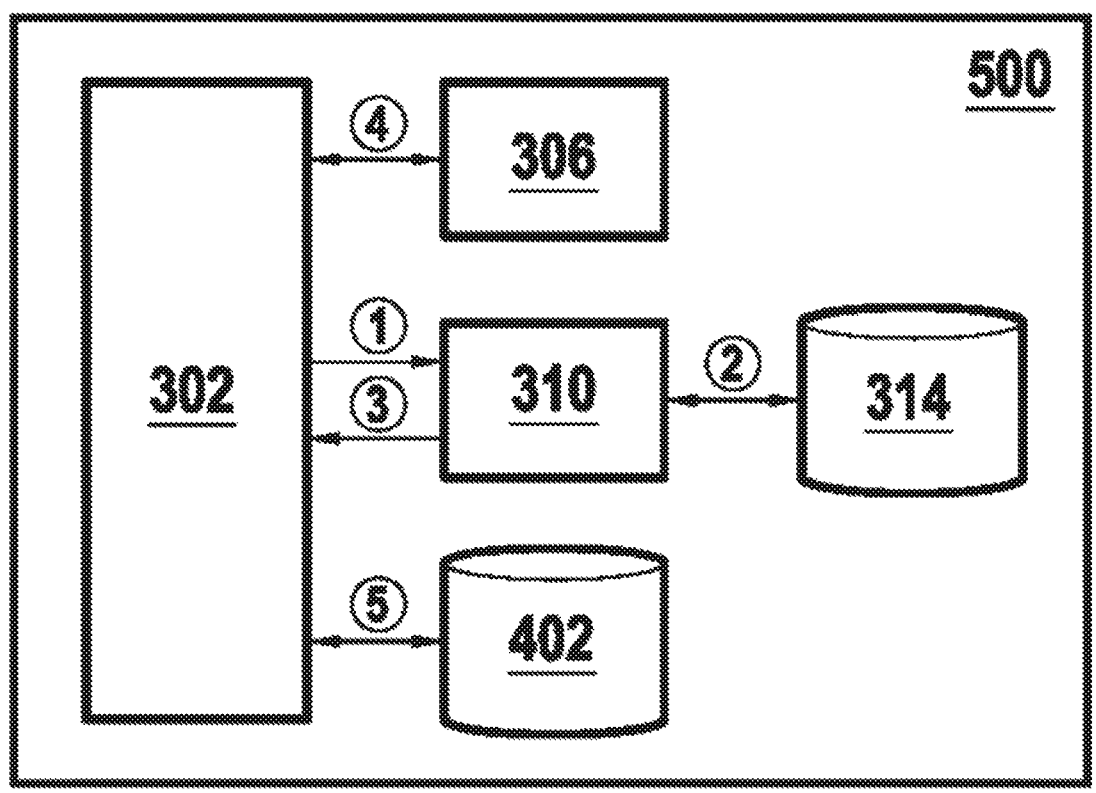

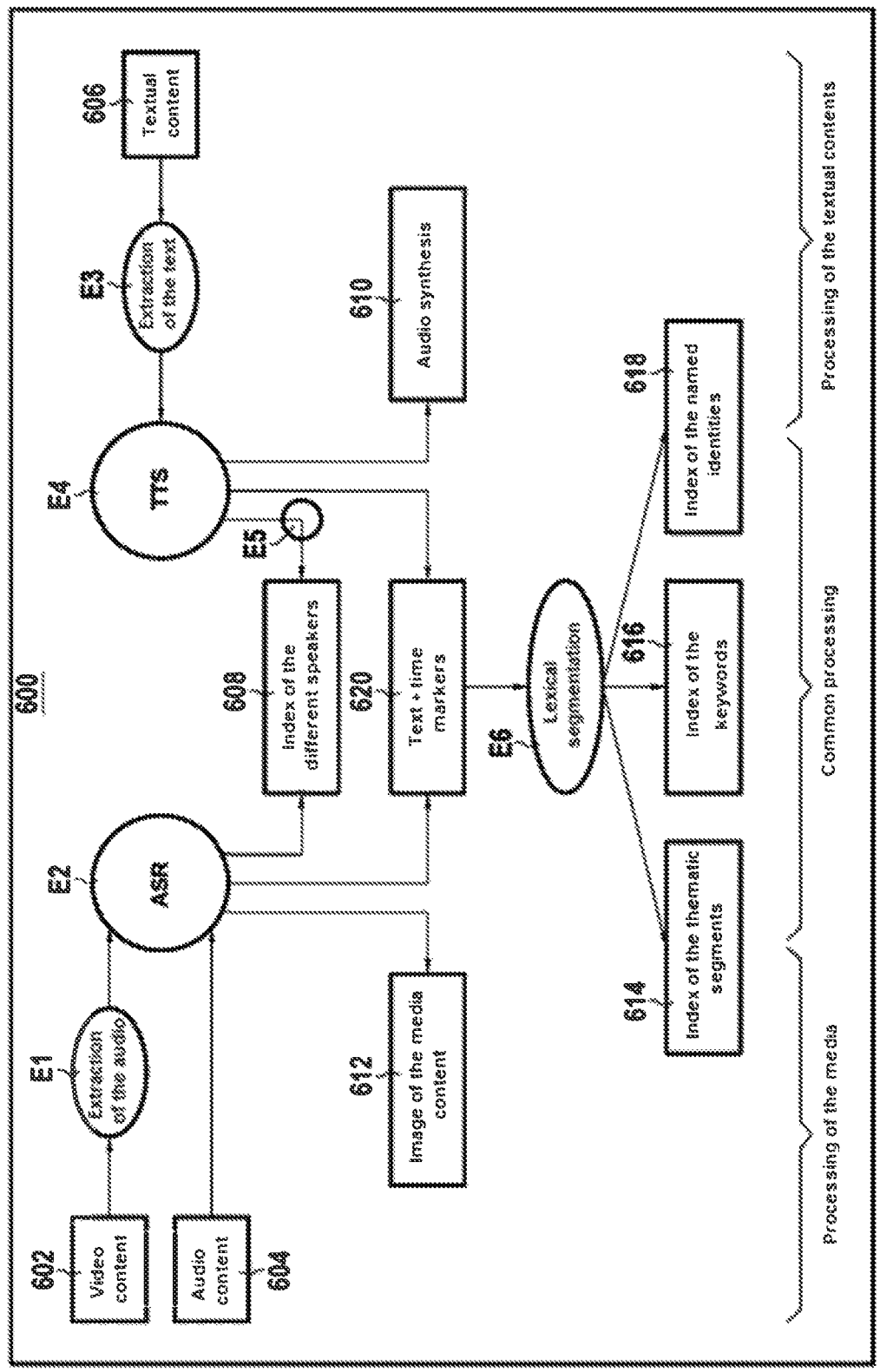

[Fig. 7]
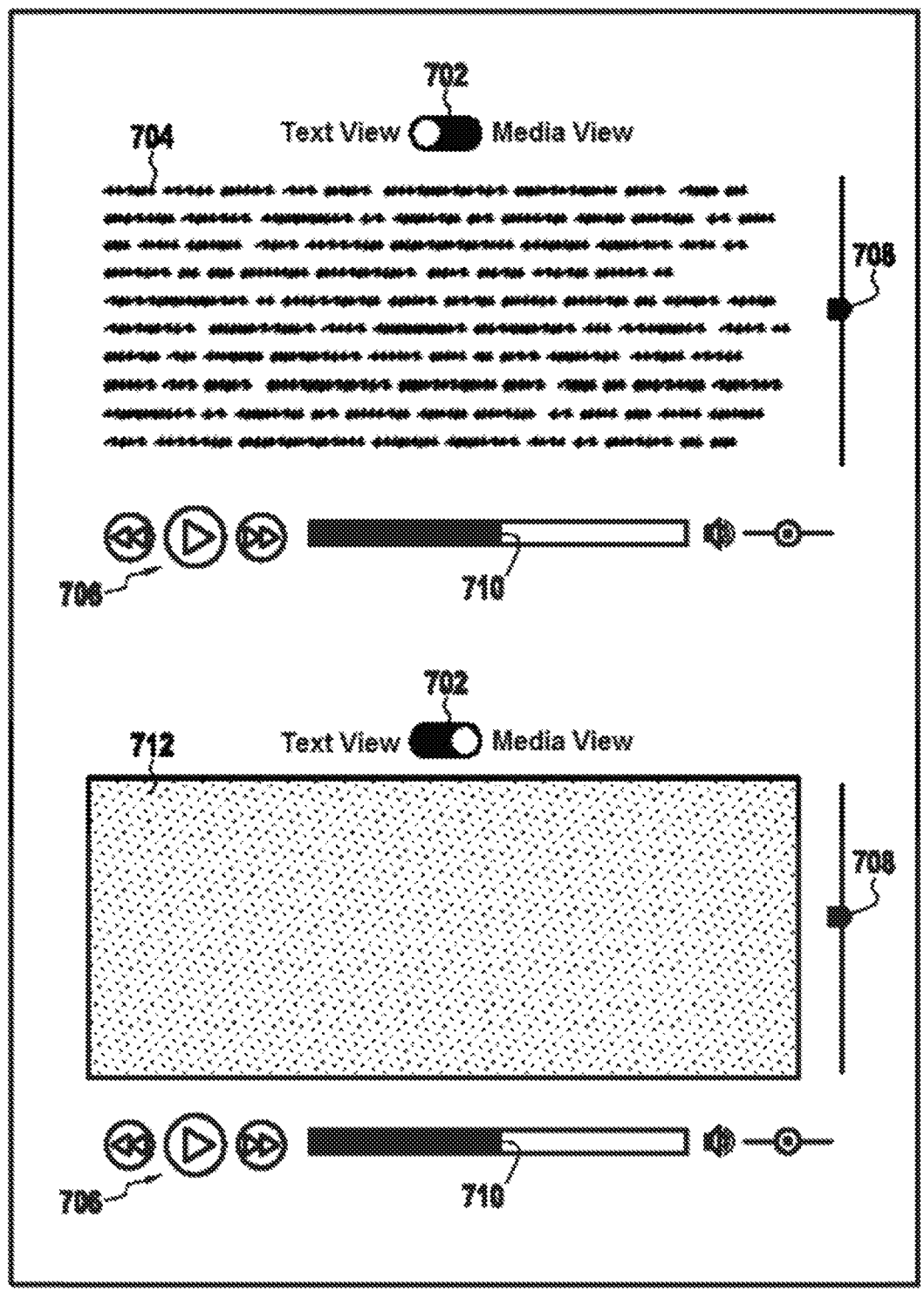

[Fig. 8]
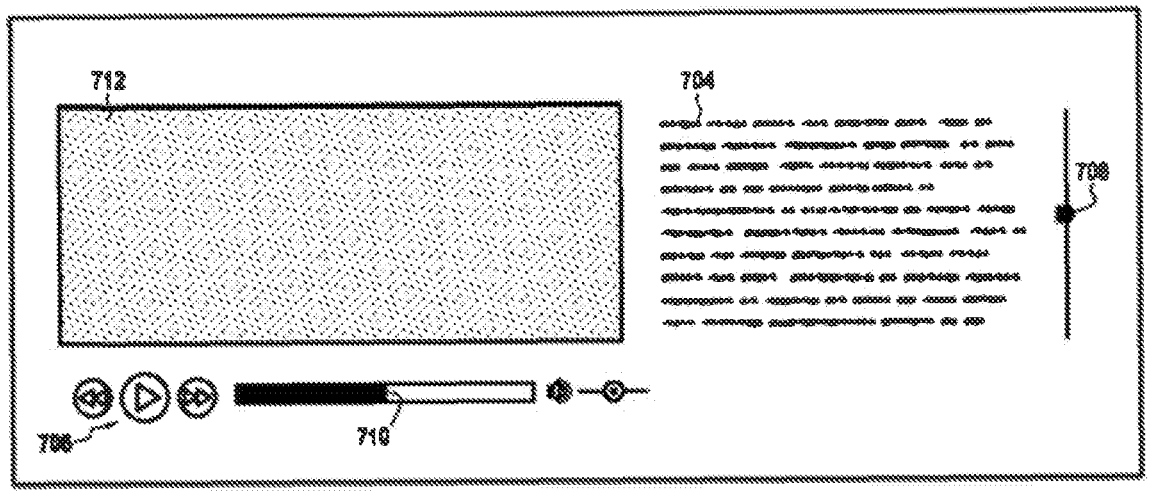
[Fig. 9]
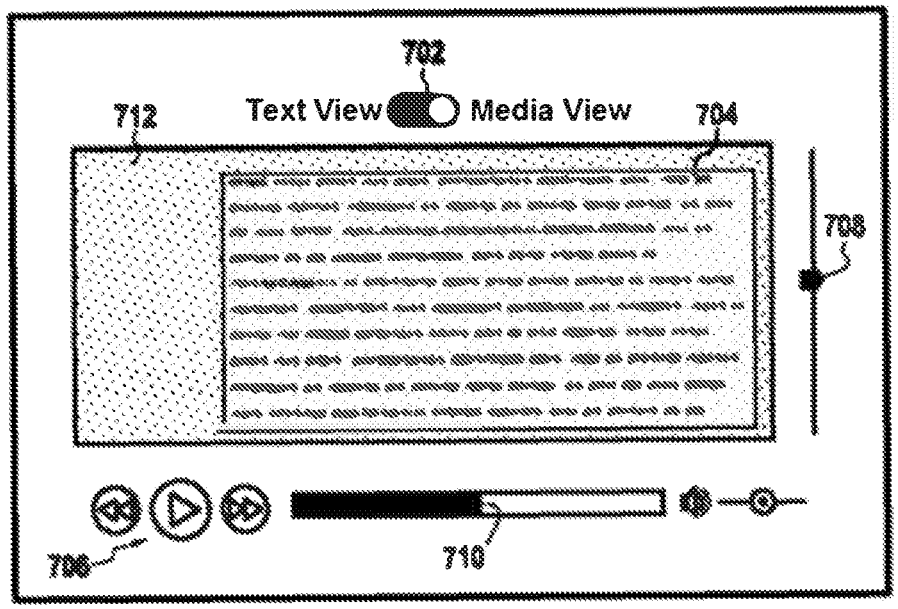

SPATIO-TEMPORAL NAVIGATION OF CONTENT OF DIFFERENT TYPES WITH SYNCHRONOUS DISPLACEMENT OF PLAYBACK POSITION INDICATORS

TECHNICAL FIELD

Today, web interfaces systematically offer two distinct and partitioned ways to navigate within a content, depending on the type of the latter: if it is a textual content (html page, blog, wiki page, pdf, etc.), the navigation is done spatially (via a vertical scroll bar for example); and if it is an audio or a video content (hereinafter called media content), the navigation is done temporally (via a horizontal temporal progress bar).

According to another aspect, the web has facilitated since its beginning the navigation from one content to another (as well as the possibility of reaching a target within the same content) thanks to the hypertext link and to the indexing of these contents within the search engines. In the case of media content, the indexing is done not on the content but on its declarative metadata (title, description, associated keywords).

The major players of the web or the solutions that have succeeded one another have not tried to break this double paradigm (the one on the intra-content navigation, the other on the navigation between contents). Thus, the usage habits of the internauts have not been modified.

However, common approaches to content navigation, either intra-content or inter-content navigation, have limitations. For example, the difference in navigation between a media content and a text content creates discontinuities in the user experience, within services increasingly combining the content types (image, video, text, etc.). In addition, the spatial navigation in a textual content can prove to be tedious when the content is very long, especially on apparatuses with reduced screen size.

SUMMARY OF THE INVENTION

The present invention makes it possible, in particular, to overcome the above-mentioned drawbacks by proposing a method for enabling a spatio-temporal navigation of content, comprising:
  a receipt of a content request from a client, the content comprising a first content of a first type; and
  a transmission to the client:
    of the first content;
    of a second content of a second type generated from the first content;
    of the synchronization metadata associating each word of one of the contents with a time marker to the other content; and
    a script, for execution at the client, configured to re-establish at least one of the contents and offer a navigation of said content depending on the type of content re-established by using at least one among: the first content, the second content, and the synchronization metadata.

In one embodiment according to the invention, the first type of content and the second type of content are distinct types of contents among: a textual content and a media content. Thus, in one embodiment according to the invention, if the first content comprises a media content, the second content comprises a text generated from an audio track extracted from the media content and the synchronization metadata comprise first synchronization metadata associating each word of the generated text with a time marker in the audio track. Otherwise, if the first content comprises a textual content, the second content comprises an audio file generated from the textual content and the synchronization metadata comprise second synchronization metadata associating each word of the textual content with a time marker in the generated audio file.

In one embodiment, the script is configured to display, in a user interface of the client, a graphical element to allow a user to select between the two types of contents (first content and second content); and re-establish the content based on the status of the graphical element.

In one embodiment, the graphical element allows the user to select between a text view mode and a media view mode of the content.

Thus, the present invention makes it possible to process a content request of any type (text or media) in order to respond with the elements necessary to enable a spatio-temporal navigation of the requested content, namely the elements necessary to make a navigation of the content possible in text view mode and/or in media view mode. This enables the same user experience regardless of the type of content. More precisely, a textual content (e.g., html page) can have a spatial navigation (via a vertical scroll bar) but also a temporal navigation (via a horizontal progress bar) thanks to the audio file generated from the content. And a media (audio/video) content can have a temporal navigation (via a horizontal progress bar) but also a spatial navigation via a vertical scroll bar thanks to the text generated from the content.

In one embodiment of the method according to the invention, wherein the graphical element allows the user to select between a text view mode and a media view mode of the content, the script is configured to:
  in response to a selection of the text view mode by the graphical element,
  if the first content comprises the media content, activate a display of the generated text and of a progress bar of the audio track, the generated text and the progress bar of the audio track being synchronized using the first synchronization metadata; and
  if the first content comprises the textual content, activate a display of the textual content and of a progress bar of the audio file, the textual content and the progress bar of the audio file being synchronized using the second synchronization metadata.

As a result, a content of any type can be displayed in two representations, a textual representation and an audio representation. The user can navigate in the content by using either (or both) of the representations as desired. The text representation of a media content allows the user to search, copy or transcribe the media content. The audio representation of a text content provides an additional way to process the content, which may prove to be easier than the reading of the content, particularly when the content is too long, especially on the apparatuses with reduced screen size.

In the same or in another embodiment of the method according to the invention, wherein the graphical element allows the user to select between a text view mode and a media view mode of the content, the script is configured to:
  in response to a selection of the media view mode by the graphical element,
  if the first content comprises the textual content, activate a display of a progress bar of the audio file; and
  if the first content comprises the media content, activate a display of a progress bar of the media content and of at least one image of the media content.

In one particular embodiment of the method according to the invention, when the text view mode is selected and if the first content comprises the media content, the script is configured to:

in response to a scrolling of the generated text, activate a synchronous displacement of a current playback position indicator of the progress bar of the audio track based on the first synchronization metadata; and in response to a movement of the current playback position indicator of the progress bar of the audio track, activate a synchronous scrolling of the generated text based on the first synchronization metadata.

The synchronization of the textual representation and the audio representation of a media content allows the user to easily use the two representations simultaneously, so as to read in the textual representation the text corresponding to a content heard in the audio representation, or conversely, to listen in the audio representation to the dialogue corresponding to a text read in the textual representation.

In another embodiment of the method according to the invention, the synchronous displacement of the current playback position indicator of the progress bar of the audition track is activated only when at least one word of the generated text is selected by the user. In this same or in another embodiment of the method, the synchronous scrolling of the generated text is activated only when the user presses a play button of the progress bar of the audio track.

According to this mode, the textual representation and the audio representation of a media content are decoupled and are linked only according to the user's choice. This allows the user, for example, to rewind or forward the audio presentation without leaving the current playback position in the textual representation. Conversely, the user can scroll through the textual representation without leaving the current playback position of the audio representation.

In one embodiment of the method according to the invention, when the text view mode is selected and if the first content comprises the textual content, the script is configured to:

in response to a scrolling of the textual content, activate a synchronous displacement of a current playback position indicator of the progress bar of the audio file based on the second synchronization metadata; and in response to a movement of the current position indicator of the progress bar of the audio file, activate synchronous scrolling of the textual content based on the second synchronization metadata.

The synchronization of the textual representation and of the audio representation of a text content allows the user to easily use the two representations simultaneously, so as to read in the textual representation the text corresponding to a content heard in the audio representation or, conversely, to listen in the audio representation to the dialogue corresponding to a text read in the textual representation.

In another embodiment of the method according to the invention, the synchronous displacement of the current playback position indicator of the progress bar of the audio file is activated only when at least one word of the textual content is selected by the user. In this same or in another embodiment of the method, the synchronous scrolling of the textual content is activated only when the user presses a play button of the progress bar of the audio file.

According to this mode, the textual representation and the audio representation of a text content are decoupled and are linked only according to the user's choice. This allows the user, for example, to rewind or forward the audio presentation without leaving the current playback position in the textual representation. Conversely, the user can scroll through the textual representation without leaving the current playback position of the audio representation.

In one particular embodiment of the method according to the invention, the method comprises:

if the first content comprises a media content, an extraction of the audio track from the media content;

a generation, from the audio track, of said text and first synchronization metadata; and a storage of said text and first synchronization metadata; and if the first content comprises a textual content, a generation, from the textual content, of the audio file and second synchronization metadata; and a storage of the audio file and second synchronization metadata.

Thus, the elements necessary for a spatio-temporal navigation of content are generated and stored to be provided to a client on demand. These elements are the same (text and audio representations and synchronization data) for any type of content.

In one particular embodiment of the method according to the invention, the generation of said text from the audio track comprises an initiation of an ASR (Automatic Speech Recognition) processing on the audio track.

In one particular embodiment of the method according to the invention, the generation of the audio file from the textual content comprises an initiation of a TTS (Text To Speech) processing on the text content.

In one particular embodiment of the method according to the invention, the method comprises:

an identification of the speakers whose voices are recorded in the audio track or in the audio file; and a generation of an index of said identified speakers.

In one particular embodiment of the method according to the invention, the method comprises:

an extraction of a text from the textual content; and a generation of the audio file and second synchronization metadata based on the extracted text.

This mode is advantageous in the case of a pdf-format textual content for example or of a content comprising a text that is not suitable for the TTS processing (e.g., metadata).

In one particular embodiment of the method according to the invention, the method comprises:

a cutting of the textual content into several text portions;

a generation of partial audio files, a partial audio file being generated from a text portion of the textual content; and a merging of all of the partial audio files generated from all the text portions of the textual content to generate said audio file.

This mode is useful when the TTS service has a limit on the size of the text it can process or when the textual content itself cannot be processed as a single text.

In one particular embodiment of the method according to the invention, the method comprises:

a lexical segmentation of the generated text or of the textual content to determine one or more element(s) among: an index of thematic segments, an index of keywords, and an index of the named entities.

This enables an even more enriched navigation in a content, particularly in the media content.

Correlatively, the invention also relates to a device enabling a spatio-temporal navigation of content, comprising:

a first module configured to receive a content request from a client, the content comprising a first content of a first type; and a second module configured to transmit to the client:
- the first content;
- a second content of a second type generated from the first content;
- synchronization metadata associating each word of one of the contents with a time marker to the other content; and
- a script, for execution at the client, configured to re-establish at least one of the contents and offer a navigation of said content depending on the type of content re-established by using at least one among: the first content, the second content, and the synchronization metadata.

In one particular embodiment of the system, the device comprises a server such as a web server for example.

In one embodiment according to the invention, the first type of content and the second type of content are distinct types of contents among: a textual content and a media content. Thus, in one embodiment according to the invention, if the first content comprises a media content, the second content comprises a text generated from an audio track extracted from the media content and the synchronization metadata comprise first synchronization metadata associating each word of the generated text with a time marker in the audio track. Otherwise, if the first content comprises a textual content, the second content comprises an audio file generated from the textual content and the synchronization metadata comprise second synchronization metadata associating each word of the textual content with a time marker in the generated audio file.

In one embodiment, the script is configured to display, in a user interface of the client, a graphical element to allow a user to select between the two types of contents (first content and second content); and re-establish the content based on the status of the graphical element.

In one embodiment, the graphical element allows the user to select between a text view mode and a media view mode of the content.

In one particular embodiment of the device, wherein the graphical element allows the user to select between a text view mode and a media view mode of the content, the script is configured to:
- in response to a selection of the text view mode by the graphical element,
  - if the first content comprises the media content, activate a display of the generated text and of a progress bar of the audio track, the generated text and the progress bar of the audio track being synchronized using the first synchronization metadata; and
  - if the first content comprises the textual content, activate a display of the textual content and of a progress bar of the audio file, the textual content and the progress bar of the audio file being synchronized using the second synchronization metadata.

In the same or in another embodiment of the device according to the invention, wherein the graphical element allows the user to select between a text view mode and a media view mode of the content, the script is configured to:
- in response to a selection of the media view mode by the graphical element,
  - if the first content comprises the textual content, activate a display of a progress bar of the audio file; and
  - if the first content comprises the media content, activate a display of a progress bar of the media content and of at least one image of the media content.

In one particular embodiment of the device according to the invention, when the text view mode is selected and if the first content comprises the media content, the script is configured to:
- in response to a scrolling of the generated text, activate a synchronous displacement of a current playback position indicator of the progress bar of the audio track based on the first synchronization metadata; and
- in response to a movement of the current playback position indicator of the progress bar of the audio track, activate a synchronous scrolling of the generated text based on the first synchronization metadata.

In another embodiment of the device according to the invention, the synchronous displacement of the current playback position indicator of the progress bar of the audio track is activated only when at least one word of the generated text is selected by the user. In this same or in another embodiment of the method, the synchronous scrolling of the generated text is activated only when the user presses a play button of the progress bar of the audio track.

In one embodiment of the device according to the invention, when the text view mode is selected and if the first content comprises the textual content, the script is configured to:
- in response to a scrolling of the textual content, activate a synchronous displacement of a current playback position indicator of the progress bar of the audio file based on the second synchronization metadata; and
- in response to a movement of the current position indicator of the progress bar of the audio file, activate a synchronous scrolling of the textual content based on the second synchronization metadata.

In another embodiment of the device according to the invention, the synchronous displacement of the current playback position indicator of the progress bar of the audio file is activated only when at least one word of the textual content is selected by the user. In this same or in another embodiment of the method, the synchronous scrolling of the textual content is activated only when the user presses a play button of the progress bar of the audio file.

In one particular embodiment of the device according to the invention, the device may comprise at least one among:
- a third module configured to extract the audio track from the media content of the content;
- a fourth module configured to generate, from the audio track, said text and the first synchronization metadata;
- a fifth module configured to generate, from the textual content of the content, said audio file and the second synchronization metadata; and
- a sixth module configured to store said text and the first synchronization metadata, as well as said audio file and the second synchronization metadata.

In one particular embodiment of the device according to the invention, the device comprises a module configured to identify the speakers whose voices are recorded in the audio track (and/or the audio file) and to generate an index of said identified speakers.

In one particular embodiment of the device according to the invention, the fifth module comprises a module configured to extract a text from the textual content and to generate said audio file and the second synchronization metadata based on the extracted text.

In one particular embodiment of the device according to the invention, the fifth module comprises:
- a module configured to cut the textual content into several text portions;

a module configured to generate partial audio files, a partial audio file being generated from a text portion of the textual content; and a module configured to merge all the partial audio files generated from all the text portions of the textual content to generate said audio file.

In one particular embodiment of the device according to the invention, the device comprises a seventh module configured to retrieve the content from at least one (textual and/or media) content provider.

In one particular embodiment of the device according to the invention, the device comprises one or more module(s) configured to perform a lexical segmentation of the generated text or of the textual content to determine one or more element(s) among: an index of thematic segments, an index of keywords and an index of the named entities.

In one particular embodiment, the various steps of the method according to the invention are determined by computer program instructions.

As a result, the invention also relates to a computer program on an information medium, this program being likely to be implemented in a server or more generally in a computer, this program including instructions adapted to the implementation of the steps of a method as described above.

This program can use any programming language, and be in the form of source code, object code, or intermediate code between source code and object code, such as in a partially compiled form, or in any other desirable form.

The invention also relates to a computer-readable information or recording medium, and including instructions of a computer program as mentioned above.

The information or recording medium may be any entity or device capable of storing the program. For example, the medium may include a storage means, such as a ROM, for example a CD ROM or a microelectronic circuit ROM, or a magnetic recording medium, for example a floppy disk or a hard disk. Alternatively, the information or recording medium may be an integrated circuit in which the program is incorporated, the circuit being adapted to execute or to be used in the execution of the method in question.

BRIEF DESCRIPTION OF THE DRAWINGS

Other characteristics and advantages of the present invention will become apparent from the description given below, with reference to the appended drawings which illustrate an exemplary embodiment without any limiting character. In the figures:

FIG. 1 represents a system in which the invention can be carried out;

FIG. 2 schematically represents the hardware architecture of a device of the system of FIG. 1, in one particular embodiment;

FIG. 3 illustrates one exemplary embodiment of the invention;

FIG. 4 illustrates the processing of textual content in the embodiment represented in FIG. 3;

FIG. 5 illustrates the processing of media content in the embodiment represented in FIG. 3;

FIG. 6 illustrates a content processing method according to one particular embodiment of the invention;

FIG. 7 illustrates the display of a content in text view mode and in media view mode according to one particular embodiment of the invention;

FIG. 8 illustrates the display of a content in simultaneous media view mode and text view mode in which both views are displayed next to each other; and FIG. 9 illustrates the display of a content in simultaneous media view mode and text view mode in which the text view is superimposed on the media view with a transparency effect.

DETAILED DESCRIPTION OF THE INVENTION

FIG. 1 represents a system 100 in which the invention can be carried out.

In the example envisaged in FIG. 1, the system 100 comprises a client 116, a device 120 in according to the invention, and a database 118.

The client 116 is able to display textual or media contents. In particular, in one particular embodiment of the system, the client 116 comprises a user interface (e.g., a navigator) that can be used to send a content request to the device 120 and to display the requested content when it is received. More specifically, as described in more detail below, the user interface is capable, using elements provided by the device 120, of displaying a content either in a text view mode or in a media view mode. As such, a spatio-temporal navigation of content is performed regardless of the type of content.

In one particular embodiment of the system, the device 120 comprises at least one server such as a web server for example. The database 118 can be integrated or external to the device 120.

In one embodiment, the device 120 has the hardware architecture of a computer 200 as illustrated in FIG. 2. It comprises in particular a processor 202, a random access memory (RAM) 204, a read-only memory (ROM) 208, a non-volatile flash memory (NVRAM) 210, as well as communication means 206 comprising one or more communication interface(s).

The communication means 206 enable in particular the device 120 to communicate with the client 116, in particular to receive from the client 116 the content request and to transmit to the client 116 the content and the display elements necessary for a spatio-temporal navigation of the content in the user interface of the client 116. The communication means 206 further enable the device 120 to communicate with the database 118 to retrieve the content and/or the display elements from the database 118 in order to transmit them to the client 116.

The read-only memory 208 constitutes a recording medium according to the invention, readable by the processor 202 and on which is recorded a computer program PROG according to the invention: the program PROG includes instructions for executing the steps of a method to enable a spatio-temporal navigation of contents according to the invention. In another embodiment, the program PROG may be recorded on the memory NVRAM 210 or in a magnetic medium (not illustrated in FIG. 2) of the device 120.

More particularly, the program PROG defines functional modules of the device 120, which are configured to implement the steps of the method according to the invention. The functional modules defined by the program PROG rely on and/or control the hardware elements 202 to 210 of the computer 200 mentioned above, and comprise in particular here, as illustrated in FIG. 1:

a first module 112 configured to receive a content request from a client, the content comprising a textual content or a media content;

a second module 114 configured to transmit to the client the content and the display elements necessary for a spatio-temporal navigation of the content in a user interface of the client;

a third module 104 configured to extract an audio track from a media content of the content;

a fourth module 106 configured to generate, from the audio track, a text and first synchronization metadata associating each word of the generated text with a time marker in the audio track;

a fifth module 108 configured to generate, from a textual content of the content, an audio file and second synchronization metadata associating each word of the textual content with a time marker in the generated audio file;

a sixth module 110 configured to store, in one or more database(s), the generated text and the first synchronization metadata, as well as the audio file and the second synchronization metadata; and a seventh module 102 configured to retrieve the content from at least one (textual and/or media) content provider.

In one embodiment, the spatio-temporal navigation of the present invention is made possible by a content processing to generate elements necessary for the spatio-temporal navigation. This processing can be performed proactively, that is to say before the content is requested, or in real time in response to a content request from the client.

In one embodiment, the processing of the content is performed according to the method represented in FIG. 6 and described below. Thus, the processing begins with the retrieval of content from one or more content provider(s). The content may include a media content (video content 602 or audio content 604) and/or a textual content 606. In one particular embodiment, the retrieval of the content is performed by the module 102 of the device 120 described above.

If the content comprises a media content (i.e., video 602 or audio 604 content), the processing comprises, in a step E1, an extraction of an audio track from the media content. In one embodiment, the extraction of the audio track from the media content takes place only in the case where the content includes a video content, an audio content directly used as such as an audio track. In one particular embodiment, the extraction of the audio track is performed by the module 104 of the device 120 described above.

Then, in a step E2, the processing of the media content comprises a generation, from the audio track, of a text and first synchronization metadata associating each word of the generated text with a time marker in the audio track. In one particular embodiment, the step E2 is performed by the module 106 of the device 120 described above.

Table 1 below illustrates an example of synchronization metadata according to one embodiment of the present invention. In one particular embodiment, the first synchronization metadata generated in the step E2 may be in the same format as the one indicated in table 1. As shown in table 1, the synchronization metadata may include one or more identifier(s) identifying the content with which the metadata are associated. In addition, the metadata associate each word of the text with at least one time marker of the audio. More specifically, in the example of Table 1, each text word is associated with a start time marker and an end time marker that identify the temporal location of the word in the audio track.

TABLE 1

Example of synchronization metadata

```
{
    "header":{
        "type":"maSegBreath",
        "corpusID":"ID of the corpus",
        "collectionId":"ID of the collection",
        "documentID":"ID of the document"
    },
    "segmentList";
    [
        {
            "startTimeSec":7.76,
            "endTimeSec":15.88,
            "value":"Hello everyone. We will present you our work in three parts."
        },
        {
            "startTimeSec":17.26,
            "endTimeSec":22.88,
            "value":"The first one will be dedicated to the description of the first concept that we have addressed,"
        },
        {
            "startTimeSec":26.66,
            "endTimeSec":"30.14,
            "value":"At least, for those who were present last week."
        }
    ]
}
```

In one particular embodiment, the media content is provided with an associated text and synchronization metadata by the content provider. Thus, the processing in the step E2 can be omitted.

In one particular embodiment according to the invention, the generation of the text from the audio track comprises an initiation of an ASR (Automatic Speech Recognition) processing on the audio track. The ASR processing recognizes the words and their temporal placement. Thus, the first synchronization metadata can be generated by an ASR service.

In one particular embodiment according to the invention, the generation (step E2) of the text from the audio track may also comprise an identification of the speakers whose voices are recorded in the audio track; and a generation of an index 608 of the identified speakers. Thus, in this embodiment, the device 120 comprises a module (not illustrated in FIG. 1) configured to identify the speakers whose voices are recorded in the audio track and to generate the index 608 of the identified speakers. This module can be a module independent of the other modules of the device 120 or, for example, integrated to the module 106.

The processing of the media content ends with the storage of the generated text and the first synchronization metadata (text and time markers 620 in FIG. 6). In another embodiment, the index of the speakers 608 and a copy 612 of the media content are also stored. In one particular embodiment, the storage is performed by the module 110 of the device 120, which stores the data in the database. 118. It is noted that the service can rely on the original content provider, and keep in the memory only the original location of the media content without having to re-encode it and then to host the copy 612 of this content in the database 118.

If the content comprises a textual content (i.e., textual content 606), the processing comprises, in a step E4, a generation, from the textual content, of an audio file and second synchronization metadata associating each word of the textual content with a time stamp in the generated audio file. In one particular embodiment, the step E4 is performed by the module 108 of the device 120 described above.

In one particular embodiment, the second synchronization metadata can be in the same format as the one indicated in Table 1.

In one particular embodiment according to the invention, the generation of the audio file from the textual content (step E4) comprises an initiation of a TTS (Text To Speech) processing on the text content. The TTS processing synthesizes and marks each word of the textual content of a time marker. Thus, the second synchronization metadata can be generated by a TTS service.

In one particular embodiment, the step E4 is preceded by a step E3 which comprises an extraction of a text from the textual content. In one particular embodiment, the step E3 is carried out in the case of a pdf-format textual content or of a content comprising a text that is not suitable for the TTS processing (e.g., metadata). Thus, the generation of the audio file and of the second synchronization metadata is performed based on the text extracted in the step E3. In one particular embodiment, the step E4 is carried out by a module of the module 108 of the device 120, configured to extract a text from the textual content and to generate the audio file and the second synchronization metadata based on the extracted text.

In one particular embodiment, the step E4 comprises a cutting of the textual content into several text portions; a generation of partial audio files, a partial audio file being generated from a text portion of the textual content; and a merging of all of the partial audio files generated from all the text portions of the textual content to generate the audio file. Thus, in this embodiment, the module 108 of the device 120 comprises a module configured to cut a textual content into several text portions; a module configured to generate a partial audio file from a text portion of the textual content; and a module configured to merge all the partial audio files to generate said audio file.

In one particular embodiment according to the invention, the generation of the audio file comprises the synthesis of different voices (for example, for highlighting different types of text (e.g., comments), speech synthesis of a dialogue comprising different speakers with, for each character, the appropriate feminine/masculine gender voice, age voice, etc.). Thus, in this mode, the generation of the audio file from the textual content may comprise, in a step E5, an identification of the speakers whose voices are recorded in audio file; and a generation of an index 608 of the identified speakers. Thus, in this embodiment, the module 108 of the device 120 comprises a module configured to identify the speakers whose voices are recorded in the file and to generate the index 608 of the identified speakers. This embodiment can be used in the use cases where the synthesis of different voices brings an interest.

The processing of the text content ends with the storage of the textual content and of the second synchronization metadata (text and time markers 620 in FIG. 6). In another embodiment, the index of the speakers 608 and the generated audio file (audio synthesis 610) are also stored. In one particular embodiment, the storage is performed by the module 110 of the device 120, which stores the data in the database 118.

In one particular embodiment according to the invention, the processing of the content may also comprise, in a step E6, a lexical segmentation of the generated text or of the textual content to determine one or more element(s) among: an index of thematic segments 614, an index of keywords 616 and an index of the named entities 618. In this embodiment, the device 120 comprises one or more integrated or independent module(s) (not illustrated in FIG. 1), configured to perform this lexical segmentation.

In one particular embodiment, the present invention may be implemented within the context of a web service. An example of a system 300 according to such an embodiment is illustrated in FIG. 3. As illustrated in FIG. 3, the system 300 comprises a user interface 301, a back-end server 302, a TTS service 304, an ASR service 306, a textual content provider 308, a media content provider 310, a textual content storage 312 and a media content storage 314.

In one embodiment, the back-end server 302 is made in accordance with the device 120 described above. The TTS service 304 and the ASR service 306 may be external third-party services, or may be integrated within the back-end server 302. The providers 308 and 310 may be publicly accessible external providers or internal providers associated with the back-end server 302.

In one particular embodiment, a textual content is processed as indicated in FIG. 4. In particular, the processing starts with the connection of the back-end server 302 to the textual content provider 308, for example via an API (Application Programming Interface) of the content provider 308, to obtain a textual content. Then, the API of the content provider 308 retrieves the requested textual content from the textual content storage 312 and provides the retrieved content to the back-end server 302.

The back-end server 302 can pre-process the retrieved content (for example, standardization, natural language processing), and then initiates the TTS processing on the content retrieved via an API of the TTS service 304. The TTS service 304 generates an audio file and the second synchronization metadata, as described above, from the textual content and sends back the audio file and the second synchronization metadata to the back-end server 302. According to the limit of processing by the API of the TTS service 304, the back-end server 302 may be in charge of cutting the textual content into several portions (e.g., paragraphs) and initiating the TTS processing for each portion separately, before managing the merging of the generated audio files.

The processing ends when the back-end server 302 stores the audio file and the second synchronization metadata, as well as the retrieved content, in a database 402.

The processing of a media content is performed as illustrated in FIG. 5 according to one embodiment of the invention. In particular, the processing begins by the connection of the back-end server 302 to the media content provider 310, for example via an API of the content provider 310, to retrieve a media content. Then, the API of the content provider 310 retrieves the requested media content from the media content storage 314 and provides the retrieved content to the back-end server 302.

The back-end server 302 extracts an audio track from the content in the event where the retrieved content includes a video content, an audio content itself constituting an audio track. Then the back-end server 302 initiates the ASR processing on the audio track via an API of the ASR service 306. The ASR service 306 generates a text and the first synchronization metadata, as described above, from the audio track and sends back the generated text and the first synchronization metadata to the back-end server 302.

The processing ends when the back-end server 302 stores the audio track and the first synchronization metadata, as well as the retrieved content, in the database 402.

As described above, according to one embodiment of the invention, the spatio-temporal navigation of content is also made possible by the fact that the device 120 provides the client 116 with the requested content as well as the elements necessary for the spatio-temporal navigation, namely, elements for displaying any type of content either in a text view mode or in a media view mode in the user interface of the client 116.

In particular, in one embodiment, in response to a content request from the client 116, the device 120 transmits to the client 116:
- the requested content;
- if the requested content comprises a media content, the text generated from the audio track extracted from the media content and the first synchronization metadata;
- if the requested content comprises a textual content, the audio file generated from the textual content and the second synchronization metadata; and
- a script, for execution at the client 116, configured to:
  - display, in the user interface of the client 116, a graphical element to allow a user of the client 116 to select between a text view mode and a media view mode of the content; and
  - re-establish the content and offer, based on the status of the graphical element, a navigation of said content in text view mode or in media view mode by using at least one among: the generated text, the first synchronization metadata, the audio file, and the second synchronization metadata.

FIG. 7 illustrates the display of a (textual or media) content, using a script provided by the device 120, in the user interface of the client 116. As illustrated, the display comprises the display of a graphical element 702, with which a user can choose to display the content either in text view mode or in media view mode.

In one particular embodiment according to the invention, in response to a selection of the text view mode using the graphical element 702, the script is configured to:
- if the content comprises a media content, activate a display of a text 704 generated from the audio track extracted from the media content and of a progress bar 706 of the audio track, and
- if the content comprises a textual content, activate a display of the textual content 704 and of a progress bar 706 of the audio file generated from the textual content.

In one particular embodiment, when the text view mode is selected and if the content comprises a media content, the script is configured to ensure a synchronization between the generated text 704 and the progress bar 706 of the audio track. In particular, using the first synchronization metadata, the script is configured to:
- in response to a scrolling of the generated text 704 via a vertical scroll bar 708, activate a synchronous displacement of a current playback position indicator 710 of the progress bar 706 of the audio track based on the first synchronization metadata; and
- in response to a movement of the current playback position indicator 710 of the progress bar of the audio track, activate a synchronous scrolling of the generated text 704 (and a corresponding displacement of the cursor of the vertical scroll bar 708) based on the first synchronization metadata.

In another embodiment according to the invention, the synchronous displacement of the current playback position indicator 710 of the progress bar of the audio track is activated only when at least one word of the generated text 704 is selected by the user. In this same or in another embodiment, the synchronous scrolling of the generated text 704 is activated only when the user presses a play button of the progress bar 706 of the audio track.

In one particular embodiment, when the text view mode is selected and if the content comprises a textual content, the script is also configured to ensure a synchronization between the textual content 704 and the progress bar 706 of the audio file generated from the textual content. In particular, using the second synchronization metadata, the script is configured to:
- in response to a scrolling of the textual content 704 via a vertical scroll bar 708, activate a synchronous displacement of a current playback position indicator 710 of the progress bar of the audio file based on the second synchronization metadata; and
- in response to a movement of the current position indicator 710 of the progress bar of the audio file, activate a synchronous scrolling of the textual content 704 (and a corresponding displacement of the cursor of the vertical scroll bar 708) based on the second synchronization metadata.

In another embodiment according to the invention, the synchronous displacement of the current playback position indicator 710 of the progress bar of the audio file is activated only when at least one word of the textual content 704 is selected by the user. In this same or in another embodiment, the synchronous scrolling of the textual content 704 is activated only when the user presses a play button of the progress bar 706 of the audio file.

In one particular embodiment according to the invention, in response to a selection of the media view mode using the graphical element 702, the script is configured to:
- if the content comprises a textual content, activate a display of a progress bar 706 of the generated audio file from the textual content; and
- if the content comprises a media content, activate a display of a progress bar 706 of the media (audio or video) content and of at least one image 712 of the media content (namely video images in the case where the content is a video).

In another embodiment, the script may further be configured to provide a hybrid representation of content that comprises a simultaneous display of the text view and media view of a given content. According to this embodiment, the graphical element 702 can be modified to allow the user to select this third option. Various implementations can be envisaged for this hybrid representation. For example, as illustrated in FIG. 8, the text view and the media view can be displayed side by side. In another implementation, as illustrated in FIG. 9, the text view can be superimposed on the media view with a transparency effect suggesting the media behind the text. In one particular embodiment, the script can also be configured to allow the user to choose the view for the hybrid representation.

According to the description above, a content of any type can be displayed either in text view mode or in media view mode, thus enabling any type of content to be brought to one and the same user experience, namely a spatio-temporal navigation for any type of content. More precisely, a textual content (e.g., html page) can have a spatial navigation (via a vertical scroll bar) but also a temporal navigation (via a horizontal progress bar) thanks to the audio file generated from the content. And a media (audio/video) content can have a temporal navigation (via a horizontal progress bar) but also a spatial navigation via a vertical scroll bar thanks to the text generated from the content.

The invention claimed is:

1. A method for enabling a spatio-temporal navigation of content, the method comprising the following acts performed by a device:
retrieving content from one or more service providers, said content comprising at least media content and textual content comprising words;
extracting from the retrieved media content, an audio track;
generating from said audio track, a text comprising words and first synchronization metadata associating each word of the generated text with a time marker in the audio track;
storing the retrieved media content, the generated text and the first synchronization metadata,
generating, from the retrieved textual content, an audio file and second synchronization metadata associating each word of the retrieved textual content with a time stamp in the generated audio file;
storing the retrieved textual content, the generated audio file and the second synchronization metadata;
performing a lexical segmentation of the generated text or of the retrieved textual content to determine one or more elements among: an index of thematic segments, an index of keywords and an index of named entities;
receiving a content request for a first type of content from a client, said first type being either a media content type or a textual content type; and
transmitting to the client:
the requested content of the first type;
a content of a second type generated from the content of the first type;
the first synchronization metadata when said requested content of the first type is a media content or the second synchronization metadata when said requested content of the first type is a textual content; and
a script, for execution at the client, configured to:
display, in a user interface of the client, a graphical element to allow a user to select between the first and second types of contents;
upon selection of one type of content among the first type and the second type with the graphical element, display the selected content type while not displaying the type of content not selected, based on a status of the graphical element;
display a current playback position indicator of a progress bar of the displayed selected content type and a current playback position indicator of a progress bar of the type of content not displayed; and
detecting a scrolling of the displayed selected content type and in response to detecting the scrolling of the displayed selected content type, activate a synchronous displacement of the current playback position indicators to indicate a scrolling progression in the displayed selected content type and in the type of content not displayed.

2. The method according to claim 1, wherein the graphical element allows the user to select between a text view mode and a media view mode, and wherein the script is configured to:
detecting a selection of the text view mode by the graphical element and in response to detecting the selection of the text view mode by the graphical element;
when the requested content of the first type is a media content, activate a display of the generated text and of a progress bar of the audio track, the generated text and the progress bar of the audio track being synchronized using the first synchronization metadata; and
when the requested content of the first type is a textual content, activate a display of the textual content and of a progress bar of the audio file, the textual content and the progress bar of the audio file being synchronized using the second synchronization metadata.

3. The method according to claim 1, wherein the graphical element allows the user to select between a text view mode and a media view mode, and wherein the script is configured to:
detecting a selection of the media view mode by the graphical element and in response to detecting the selection of the media view mode by the graphical element;
when the requested content of the first type is the textual content, activate a display of a progress bar of the audio file; and
when the requested content of the second type is the media content, activate a display of a progress bar of the media content and of at least one image of the media content.

4. The method according to claim 1, wherein the graphical element allows the user to select between a text view mode and a media view mode, and wherein the script is configured to, when the text view mode is selected and the requested content of the first type is the media content:
detecting a scrolling of the displayed generated text and in response to detecting the scrolling of the generated text, activate a synchronous displacement of a current playback position indicator of a progress bar of the audio track based on the first synchronization metadata; and
detecting a movement of the current playback position indicator of the progress bar of the audio track and in response to detecting the movement, activate a synchronous scrolling of the generated text based on the first synchronization metadata.

5. The method according to claim 1, wherein the graphical element allows the user to select between a text view mode and a media view mode, and wherein the script is configured to, when the text view mode is selected and the requested content of the first type is the textual content:
detecting a scrolling of the textual content and in response to a detecting the scrolling of the textual content, activate a synchronous displacement of a current playback position indicator of a progress bar of the audio file based on the second synchronization metadata; and
detecting a movement of the current position indicator of the progress bar of the audio file and in response to a detecting the movement of the current position indicator of the progress bar of the audio file, activate a synchronous scrolling of the textual content based on the second synchronization metadata.

6. The method according to claim 1, comprising:
when the requested content of the first type is a media content:
extracting the audio track from the media content;
generating, from the audio track, said text and first synchronization metadata; and
storing said text and first synchronization metadata; and
when the requested content of the first type comprises a textual content:
generating, from the textual content, the audio file and second synchronization metadata; and
storing the audio file and second synchronization metadata.

7. The method according to claim 1, comprising:
identifying speakers whose voices are recorded in the audio track or in the audio file; and
generating an index of said identified speakers.

8. The method according to claim 1, comprising:
extracting a text from the textual content; and
generating the audio file and second synchronization metadata based on the extracted text.

9. The method according to claim 1, comprising:
cutting the textual content into several text portions;
generating partial audio files, a partial audio file being generated from a text portion of the textual content; and
merging all of the partial audio files generated from all the text portions of the textual content to generate said audio file.

10. A non-transitory computer-readable recording medium on which is recorded a computer program including instructions, which when executed by a device configure the device to perform a method enabling a spatio-temporal navigation of content, the instructions configuring the device to:
retrieve content from one or more service providers, said content comprising at least media content and textual content comprising words;
extract from the retrieved media content, an audio track;
generate from said audio track, a text comprising words and first synchronization metadata associating each word of the generated text with a time marker in the audio track;
store the retrieved media content, the generated text and the first synchronization metadata;
generate, from the retrieved textual content, an audio file and second synchronization metadata associating each word of the retrieved textual content with a time stamp in the generated audio file;
store the retrieved textual content, the generated audio file and the second synchronization metadata;
perform a lexical segmentation of the generated text or of the retrieved textual content to determine one or more elements among: an index of thematic segments, an index of keywords and an index of named entities;
receive a content request for a first type of content from a client, said first type being either a media content or a textual content; and
transmit to the client:
the requested content of the first type;
a content of a second type generated from the content of the first type;
the first synchronization metadata when said requested content of the first type is a media content or the second synchronization metadata when said requested content of the first type is a textual content; and
a script, for execution at the client, configured to:
display, in a user interface of the client, a graphical element to allow a user to select between the first and second types of contents;
upon selection of one type of content among the first type and the second type with the graphical element, display the selected content type while not displaying the type of content not selected, based on a status of the graphical element;
display a current playback position indicator of a progress bar of the displayed selected content type and a current playback position indicator of a progress bar of the type of content not displayed; and
detecting a scrolling of the displayed selected content type and in response to a detecting the scrolling of the displayed selected content type, activate a synchronous displacement of the current playback position indicators to indicate a scrolling progression in the displayed selected content type and in the type of content not displayed.

11. A device enabling a spatio-temporal navigation of content, comprising:
a processor; and
a non-transitory computer-readable medium comprising instructions stored thereon, which when executed by the processor configure the device to;
retrieve content from one or more service providers, said content comprising at least media content and textual content comprising words;
extract from the retrieved media content-retrieved, an audio track;
generate from said audio track, a text comprising words and first synchronization metadata associating each word of the generated text with a time marker in the audio track;
store the retrieved media content, the generated text and the first synchronization metadata;
generate, from the retrieved textual content, an audio file and second synchronization metadata associating each word of the retrieved textual content with a time stamp in the generated audio file;
store the retrieved textual content, the generated audio file and the second synchronization metadata;
perform a lexical segmentation of the generated text or of the retrieved textual content to determine one or more elements among: an index of thematic segments, an index of keywords and an index of named entities;
receive a content request for a first type of content from a client, said first type being either a media content or a textual content; and
transmit to the client:
the requested content of the first type;
a content of a second type generated from the content of the first type;
the first synchronization metadata when said requested content of the first type is a media content or the second synchronization metadata when said requested content of the first type is a textual content; and
a script, for execution at the client, configured to:
display, in a user interface of the client, a graphical element to allow a user to select between the first and second types of contents;
upon selection of one type of content among the first type and the second type with the graphical element, display the selected content type while not displaying the type of content not selected, based on a status of the graphical element;
display a current playback position indicator of a progress bar of the displayed selected content type and a current playback position indicator of a progress bar of the type of content not displayed; and
detecting a scrolling of the displayed selected content type and in response to detecting the scrolling of the displayed selected content type, activate a synchronous displacement of the current playback position indicators to indicate a scrolling progression in the displayed selected content type and in the type of content not displayed.

* * * * *